Dec. 30, 1969  J. R. DAWSON ET AL  3,487,206
CONCEALED VEHICLE RUNNING LIGHT ASSEMBLY
Filed April 10, 1967
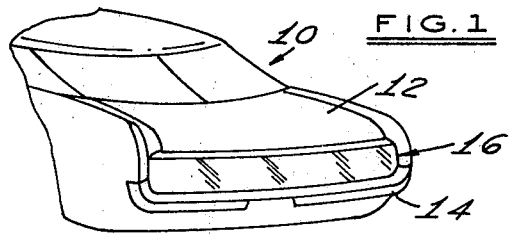
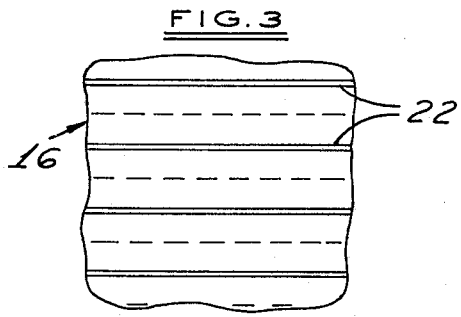
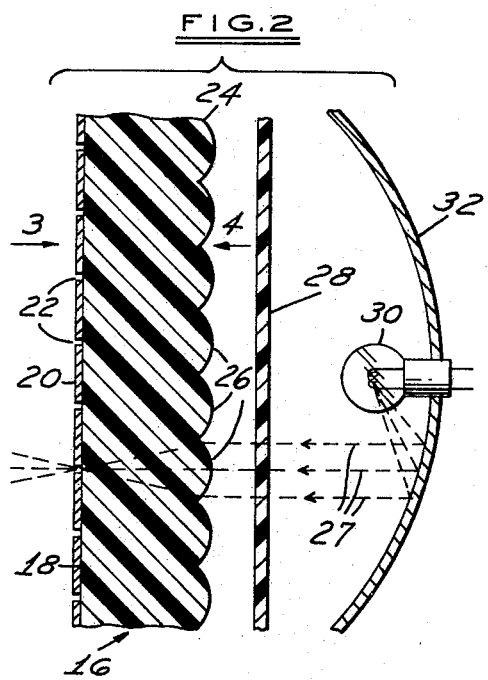
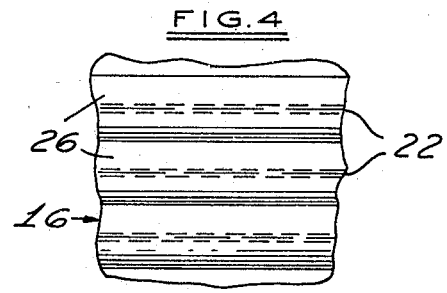
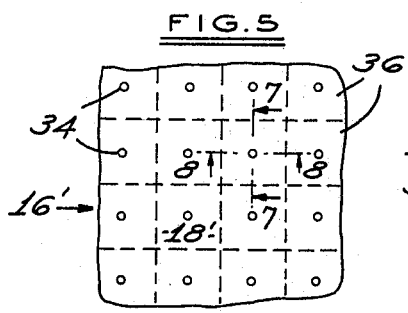
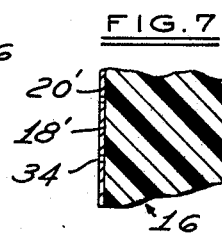
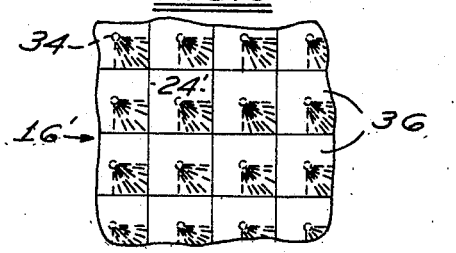
JOHN R. DAWSON
ROY L. HUBER
INVENTORS
BY John R. Faulkner
E. Dennis O'Connor
ATTORNEYS

United States Patent Office 3,487,206
Patented Dec. 30, 1969

3,487,206
CONCEALED VEHICLE RUNNING LIGHT ASSEMBLY
John R. Dawson, Dearborn, and Roy L. Huber, Plymouth, Mich., assignors to Ford Motor Company, Dearborn, Mich., a corporation of Delaware
Filed Apr. 10, 1967, Ser. No. 629,668
Int. Cl. B60q 1/28
U.S. Cl. 240—8.3                                   16 Claims

ABSTRACT OF THE DISCLOSURE

A vehicle running light assembly in which the running light when inoperative is concealed by a vehicle body panel having a generally opaque exterior surface with non-opaque interstices that permit the passage of light therethrough. Between the exterior surface of the body panel and the light source are positioned lens means focusing light from the light source on the interstices in the panel exterior surface.

BACKGROUND OF THE INVENTION

Various attempts have been made to design a vehicle running light assembly that appears to be a conventional opaque body panel when the running light bulb is extinguished, but permits the bulb to perform its conventional signaling function. For example, running light bulbs have been mounted interiorly of concealing, translucent body panels that prevent ambient light from being reflected by the bulb and its supporting structure, but allow the passage to the exterior of the vehicle of light from the bulb. A problem attendant such arrangements is that the intensity of the bulb light observable from the exterior of the vehicle is insufficient to fulfill the signaling function of a running light.

This invention provides a vehicle running light assembly that allows styling flexibility and is aesthetically pleasing in that it appears to the human eye to be a conventional opaque body panel when viewed from exterior of the vehicle, and does not impair the signaling function of a conventional running light bulb.

BRIEF SUMMARY OF THE INVENTION

A running light assembly constructed in accordance with this invention is adapted for utilization in a motor vehicle body structure and includes a body panel having an exterior surface that is opaque but for a plurality of non-opaque interstices permitting the passage of light therethrough. A light source is secured to the body structure interiorly of the panel. A plurality of lens means are mounted between the exterior surface of the panel and the light source. Each of the lens means focuses light from the light source on one of the interstices.

DESCRIPTION OF THE DRAWING

FIGURE 1 is an isometric view of a portion of a motor vehicle having a running light assembly including a concealing panel and constructed in accordance with this invention;

FIGURE 2 is a side sectional view of a first embodiment of a running light assembly;

FIGURE 3 is an elevation view of the exterior surface of the body panel included in the assembly of FIGURE 2;

FIGURE 4 is an elevation view of the interior surface of the body panel included in the assembly of FIGURE 2;

FIGURE 5 is an elevation view of the exterior surface of a body panel utilized in a second embodiment of this invention;

FIGURE 6 is an elevation view of the interior surface of the body panel of FIGURE 5;

FIGURE 7 is a sectional vew taken along the line 7—7 of FIGURE 5; and

FIGURE 8 is a sectional view taken along the line 8—8 of FIGURE 5.

DETAILED DESCRIPTION OF THE INVENTION

Referring now in detail to the drawings and in particular to FIGURES 1–4, the numeral 10 denotes a motor vehicle having a rear deck 12 and bumper 14 that frame a panel 16 which conceals the vehicle rear running lights such as the tail and brake lights and directional turn indicators. To the human eye, panel 16 appears to be a conventional opaque body panel.

Panel 16 is formed from transparent material such as acrylic plastic and has an exterior surface 18 covered in part by an opaque coating 20 that may be paint identical to that applied to other body panels such as deck 12, or other desired decorative substances. Small gaps or interstices in coating 20 in the form of slits 22 are provided during the application of coating 20. The interior surface 24 of panel 16 is formed in the shape of a plurality of elongated convex lens 26. Each one of said lens 26 is located opposite one of the slits 22 and the longitudinal axes of the slits and lens are parallel. The focal length of lens 26 is such that light rays, illustrated at 27, striking a lens will be focused on one of the slits.

A colored light filter 28 is spaced from surface 24. Spaced from filter 28 is a conventional running light bulb 30 surrounded in the usual manner by a parabolic reflector 32.

The assembly described above functions in the following manner. Since the opaque area of exterior surface 18 exceeds greatly the non-opaque area of this surface, panel 16 appears to the human eye, which integrates ambient light reflected by the surface, to be a conventional opaque body panel when bulb 30 is extinguished. Upon the illumination of bulb 30, light rays are reflected by reflector 32 and become colored by passage through filter 28. These light rays are focused by lens 26 on slits 22 and thus pass through panel 16 to the exterior of the vehicle. It readily may be appreciated that this arrangement allows a high proportion of the light from bulb 30 to pass through slits 22 regardless of the small area of the slits relative to the area of opaque coating 20. Thus, the requisite signaling function of the running light is not impaired by concealment behind panel 16.

FIGURES 5–8 illustrate a second embodiment of this invention utilizing a concealing panel 16′ having an exterior surface 18′ covered in part by opaque coating 20′. The interstices in coating 20′ are small circular apertures 34 regularly spaced in the coating. The interior surface 24′ of panel 16′ has integrally formed thereon a plurality of converging lens 36 that are spherical sections, as may be seen by a comparison of FIGURES 7 and 8. Lens 36 function to focus light from a bulb on apertures 34 (FIGURE 6). Therefore, this embodiment functions in the same manner as the embodiment of FIGURES 2–4 described above.

The light filter such as element 28 may be eliminated by tinting the transparent material of the concealing panel to give the desired color to light from the bulb. Also, the lens may be formed on a discrete element separate from the outer panel. The latter may be formed from conventional sheet metal with the desired interstices as apertures extending through the sheet metal.

This invention thus provides a vehicle running light assembly that is concealed from view when inoperative, but that functions satisfactorily when operative to emit light having the necessary intensity for signaling purposes.

It is to be understood that this invention is not limited to the exact construction shown and described above, but that various changes and modifications may be made without departing from the spirit and scope of the invention as defined by the following claims.

We claim:
1. In a motor vehicle body structure, a plurality of exterior body panels, the exterior surfaces of said panels being covered with a decorative opaque coating, an additional exterior body panel contiguous to said plurality of panels, the exterior surface of said additional body panel being generally opaque and having a non-opaque interstice permitting the passage of light therethrough, a light source secured to said body structure interiorly of said additional panel, and lens means secured between the exterior surface of said additional panel and said light source and focusing light rays impinging on said lens means from said light source on said transparent interstice.

2. The combination of claim 1, wherein the opaque portion of the surface of said additional panel comprises an opaque coating identical to the opaque coating on the exterior surfaces of said plurality of panels.

3. The combination of claim 1, wherein said interstice is substantially circular and said lens means is a converging lens including a convex spherical section proximate said light source.

4. The combination of claim 1, wherein said interstice is a slit, said lens means being elongate and coextensive with said slit.

5. The combination of claim 4, wherein the longitudinal axis of said lens mean is parallel to the longitudinal axis of said slit.

6. The combination of claim 5, wherein said lens means is a converging lens having a convex surface proximate said light source.

7. The combination of claim 1, wherein said additional panel is formed from transparent material, said exterior surface covered with a decorative opaque coating but for said interstice, at least a portion of the interior surface of said panel comprising said lens means.

8. The combination of claim 7, wherein said transparent material is colored and filters light from said light source passing therethrough.

9. The combination of claim 7, wherein said interstice is a slit, the lens portion of the interior surface of said panel comprising an elongate converging lens having a convex surface, the longitudinal axis of said lens being parellel to the longitudinal axis of said slit.

10. The combination of claim 7, wherein said interstice is substantially circular, the lens portion of the interior surface of said panel comprising a converging lens having a convex surface, said convex surface comprising a spherical section.

11. In a motor vehicle body structure, a plurality of exterior body panels, the exterior surfaces of said panels being covered with a decorative opaque coating, an additional exterior body panel contiguous to said plurality of panels, the exterior surface of said additional panel being generally opaque and having a plurality of non-opaque interstices permitting the passage of light therethrough, said interstices comprising spaced parallel slits, a light source secured to said body structure interiorly of said panel, a plurality of elongate lens means secured between the exterior surface of said additional panel and said light source, each of said lens means focusing light from said light source on one of said slits.

12. The combination of claim 11, wherein said additional panel is formed from transparent material, said exterior surface of said additional panel being covered with a decorative opaque coating but for said slits, the interior surface of said additional panel including said lens means.

13. The combination of claim 12, wherein each of said lens means comprises a cylindrical section.

14. In a motor vehicle body structure, a plurality of exterior body panels, the exterior surfaces of said panels being covered with a decorative opaque coating, an additional exterior body panel contiguous to said plurality of panels, the exterior surface of said additional panel being generally opaque and having a plurality of non-opaque interstices permitting the passage of light therethrough, said interstices being regularly spaced and substantially circular, a light source secured to said body structure interiorly of said additional panel, a plurality of lens means secured between the exterior surface of said panel and said light source, each of said lens means focusing light from said light source on one of said interstices.

15. The combination of claim 14, wherein said additional panel is formed from transparent material, said exterior surface of said additional panel being covered with a decorative opaque coating but for said interstices, the interior surface of said additional panel including said lens means.

16. The combination of claim 15, wherein each of said lens means comprises a spherical section.

References Cited

UNITED STATES PATENTS

| | | | |
|---|---|---|---|
| 1,255,755 | 2/1918 | Johanson | 240—46.51 |
| 1,686,525 | 10/1928 | House | 240—41.3 XR |
| 2,102,928 | 12/1937 | Van Leunen | 240—41.3 |
| 2,119,370 | 5/1938 | Van Leunen | 240—41.3 |
| 2,199,014 | 4/1940 | Stitt | 240—46.59 XR |
| 2,202,278 | 5/1940 | White | 240—41.3 |
| 2,341,822 | 2/1944 | Seal | 240—41.3 XR |
| 2,699,515 | 1/1955 | Williams | 240—46.51 XR |
| 2,907,249 | 10/1959 | Hjermstad | 240—41.4 XR |

NORTON ANSHER, Primary Examiner

R. P. GREINER, Assistant Examiner

U.S. Cl. X.R.

240—41.3, 46.51